US012775885B2

(12) United States Patent
Tang et al.

(10) Patent No.: US 12,775,885 B2
(45) Date of Patent: Oct. 27, 2026

(54) PREDICTING THE CONJUNCTION OF EVENTS BY APPROXIMATE DECOMPOSITION

(71) Applicant: Hitachi, Ltd., Tokyo (JP)

(72) Inventors: Hsiu-Khuern Tang, San Jose, CA (US); Haiyan Wang, Fremont, CA (US); Chetan Gupta, San Mateo, CA (US)

(73) Assignee: HITACHI, LTD., Tokyo (JP)

( * ) Notice: Subject to any disclaimer, the term of this patent is extended or adjusted under 35 U.S.C. 154(b) by 1363 days.

(21) Appl. No.: 17/542,266

(22) Filed: Dec. 3, 2021

(65) Prior Publication Data

US 2023/0177403 A1 Jun. 8, 2023

(51) Int. Cl.

*G06N 20/20* (2019.01)
*G06F 18/10* (2023.01)
*G06F 18/21* (2023.01)
*G06F 18/211* (2023.01)
*G06F 18/214* (2023.01)

(52) U.S. Cl.

CPC ............. *G06N 20/20* (2019.01); *G06F 18/10* (2023.01); *G06F 18/211* (2023.01); *G06F 18/214* (2023.01)

(58) Field of Classification Search

CPC .............................. G05B 23/024; G06N 20/00
See application file for complete search history.

(56) References Cited

U.S. PATENT DOCUMENTS 11,648,962 B1 * 5/2023 Crego .................... G08G 1/166 701/26
11,810,365 B1 * 11/2023 Crego .................... G06V 20/58
2015/0356576 A1 * 12/2015 Malaviya ........... G06Q 30/0202 705/7.31
2020/0097921 A1 * 3/2020 Ghosh ...................... G06N 3/09
2021/0182696 A1 * 6/2021 Morimura .............. G06N 20/20
2021/0357773 A1 * 11/2021 Hurewitz .............. G06F 16/248
2022/0296334 A1 * 9/2022 Fathollahi Ghezelghieh .............. G06N 3/0895

OTHER PUBLICATIONS

Blozis, S. et al. "Using a two-part mixed-effects model for understanding daily, individual-level media behavior" Journal of Marketing Analytics, May 10, 2019. 17 pages.
Bonfrer, A. et al. "Real-Time Evaluation of Email Campaign Performance" Research Collection Lee Kong Chian School of Business. Institutional Knowledge at Singapore Management University. Oct. 2008. 49 pages.
Deb, P. et al. "Modeling Health Care Expenditures and Use" Annual Review of Public Health 2018. 39.489-505. 21 Pages.

* cited by examiner

*Primary Examiner* — Eric Nilsson
(74) *Attorney, Agent, or Firm* — PROCOPIO, CORY, HARGREAVES & SAVITCH LLP

(57) ABSTRACT

Example implementations described herein are directed to systems and methods for predicting if a conjunction of multiple events will occur within a certain time. It relies on an approximate decomposition into subproblems and a search among the possible decompositions and hyperparameters for the best model. When the conjunction is rare, the method mitigates the problem of data imbalance by estimating events that are less rare.

19 Claims, 7 Drawing Sheets

| | P10 | P25 | AUCPR |
|---|---|---|---|
| Direct method | 0.774 | 0.664 | 0.502 |
| Decomposition method | 0.793 | 0.674 | 0.518 |
| Decomposition method with hyperparameter tuning | 0.809 | 0.700 | 0.532 |

FIG. 5

PREDICTING THE CONJUNCTION OF EVENTS BY APPROXIMATE DECOMPOSITION

BACKGROUND

Field

The present disclosure is generally directed to industrial applications, and more specifically, to determining event conjunction by approximate decomposition.

Related Art

Suppose there is a need to predict if an event e will occur within a certain time. This is a common problem with many industrial applications, such as equipment health monitoring and condition-based maintenance. The decomposition method applies when e is the conjunction of two or more events, e.g., e happens if events c and d both happen. In many applications, e is a rare event, which makes the problem more challenging.

In related art implementations, hurdle models and two-part models also rely on Bayes Theorem. They are general techniques for modeling a discrete or continuous outcome y with a positive probability at 0, and have been used to predict healthcare expenditures, doctor visits, and TV use. They use two models, one to predict if y=0 or y>0—a binary classification problem—and another to predict y given that y>0.

To predict the time to an event e when e depends on the occurrence of an earlier event c, one approach is to predict the time to c and the time between c and e as separate subproblems. This has been proposed in the related art for predicting email click-through times, using email opening as the intermediate event.

SUMMARY

Example implementations are directed to systems and methods to estimate events that are less rare, for which there are more data samples for learning. Such example implementations may provide a more accurate estimate than conventional methods that model the possibly rare event e directly. The example implementations further use Bayes' Theorem to get a multitude of different approximate decompositions and so differs from hurdle/two-part models. It applies when the event of interest e is a conjunction of two or more other events; hence all these events are simultaneous and not sequentially ordered.

Let $T_e$ be the time to the event, so the problem is to estimate the probability $P(T_e \leq t)$. Example implementations described herein decompose this estimation problem into multiple estimation subproblems using Bayes Theorem and the fact that e is the conjunction of two or more events. There are two kinds of subproblems.

Analogous subproblem: estimating $P(T_c \leq t)$ for a more common event c. This mitigates the challenges associated with predicting a rare event e, since there are more data samples with the event c.

Classification subproblem: estimating the conditional probability that the next c-event is an e-event given that c occurs within a certain time u.

The subproblems can be estimated independently using standard machine learning models. The product of those estimates is an approximation to the original problem $P(T_e \leq t)$.

The decomposition can be done in multiple ways and involves the hyperparameter(s) u. By searching among the possible decompositions and hyperparameter values, and by combining the best models for the subproblems, it can be possible to obtain a more accurate estimate than conventional methods that model $P(T_e \leq t)$ directly.

Aspects of the present disclosure can involve a method, which can include, for generating a model configured to predict a first event occurring within a first time period for a physical system, identifying a second event that is a co-occurring pre-requisite for the occurrence of the event; learning a first model for the second event occurring within the first time period; generating a second model configured to determine probability of the first event given occurrence of the second event within the first time period; generating a third model, the third model resulting in a more accurate prediction of the first event occurring within the first time period than the second model when used with the first model; and generating the model based on the first model and the third model.

Aspects of the present disclosure can involve a system, which can include, for generating a model configured to predict a first event occurring within a first time period for a physical system, means for identifying a second event that is a co-occurring pre-requisite for the occurrence of the event; means for learning a first model for the second event occurring within the first time period; means for generating a second model configured to determine probability of the first event given occurrence of the second event within the first time period; means for generating a third model, the third model resulting in a more accurate prediction of the first event occurring within the first time period than the second model when used with the first model; and means for generating the model based on the first model and the third model.

Aspects of the present disclosure can involve a computer program, storing instructions for executing a process, the instructions which can include, for generating a model configured to predict a first event occurring within a first time period for a physical system, identifying a second event that is a co-occurring pre-requisite for the occurrence of the event; learning a first model for the second event occurring within the first time period; generating a second model configured to determine probability of the first event given occurrence of the second event within the first time period; generating a third model, the third model resulting in a more accurate prediction of the first event occurring within the first time period than the second model when used with the first model; and generating the model based on the first model and the third model. The instructions can be stored on a non-transitory computer readable medium and executed by one or more processors.

Aspects of the present disclosure can involve an apparatus, which can include a processor, configured to, for generating a model configured to predict a first event occurring within a first time period for a physical system, identify a second event that is a co-occurring pre-requisite for the occurrence of the event; learn a first model for the second event occurring within the first time period; generate a second model configured to determine probability of the first event given occurrence of the second event within the first time period; generate a third model, the third model resulting in a more accurate prediction of the first event occurring within the first time period than the second model when used with the first model; and generate the model based on the first model and the third model.

BRIEF DESCRIPTION OF DRAWINGS

FIG. 5 illustrates examples of performance metrics achieved by a direct method of predicting periodic maintenance and two variants of the method in accordance with the example implementations described herein.

DETAILED DESCRIPTION

Figure 1:
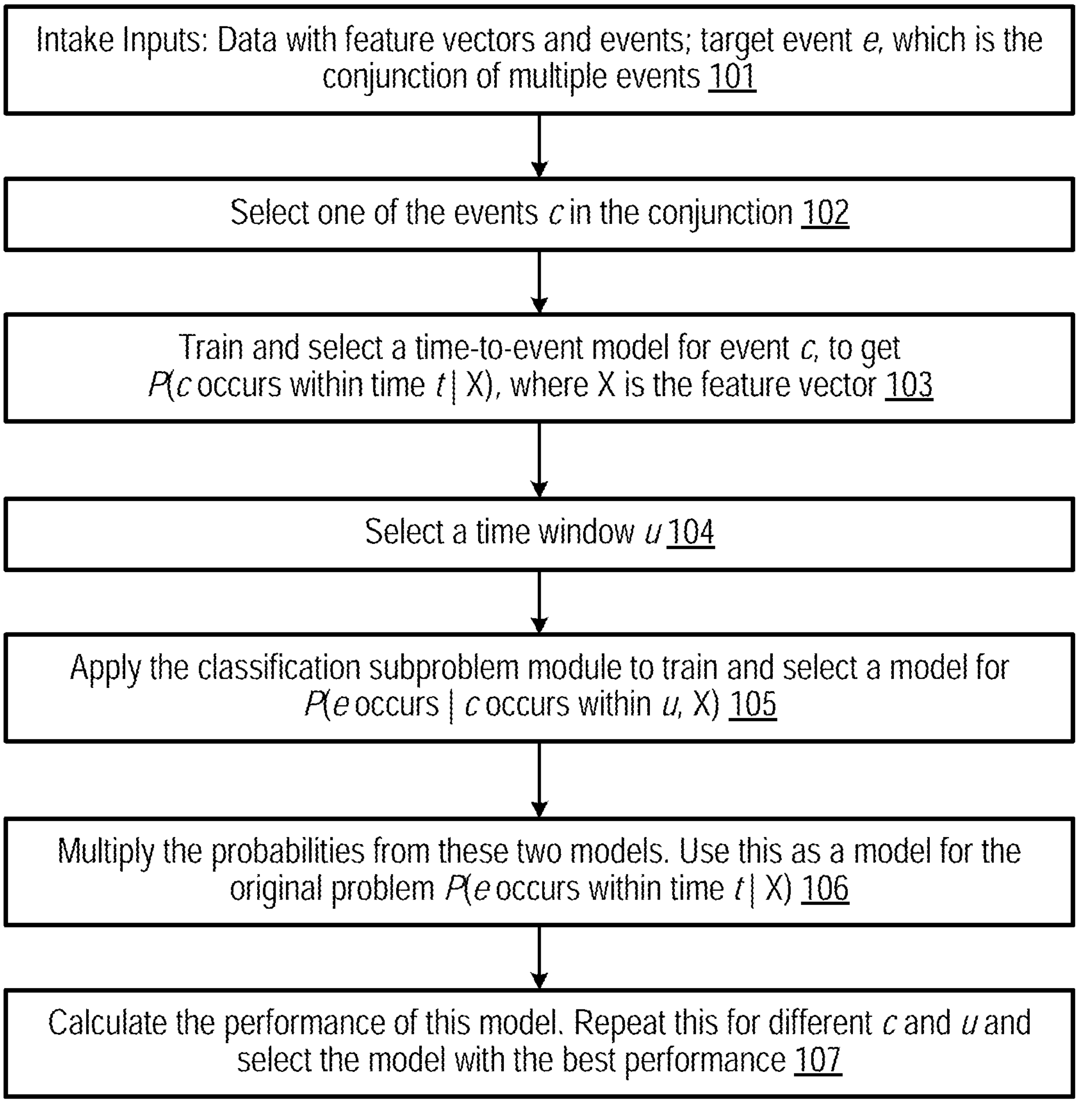
FIG. 1 illustrates the overall decomposition method, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Suppose there is a need to predict if an event e will occur within a certain time t, where e is the conjunction of other events c and d, i.e., e occurs at t if c and d both occur at t. c can be considered as a co-occurring pre-requisite for the occurrence of the event e. Let $T_e$ and $T_c$ be the times to the next e-event and c-event, respectively. By Bayes Theorem, $$P(T_e=T_c\leq t)=P(T_c\leq t)\times P(T_e=T_c|T_c\leq t) \quad (1)$$

The right-hand-side of equation (1) involves two parts:

$P(T_c\leq t)$, which is analogous to the original problem but for the more common event c. This is known as the analogous subproblem.

$P(T_e=T_c|T_c\leq t)$, the conditional probability that the next c-event is also an e-event given that c occurs within time t. In practice, this conditional probability may be insensitive to the value t. If so $$P(T_e=T_c|T_c\leq t)\approx P(e \text{ occurs at the next } c \text{ event}|T_c\leq u) \quad (2A)$$

where u need not be the same as the t from the original problem. When u is large, the above conditional probability approaches $$P(e \text{ occurs at the next } c \text{ event}) \quad (2B)$$

Estimating (2A) or (2B) are binary classification problems that can be learned from all the data where c is observed within some time u (2A) or where c is observed (2B). This is the classification subproblem.

The original problem $P(T_e\leq t)$ can be written as $$P(T_e\leq t)=P(T_e=T_c\leq t)+P(T_c\leq T_e\leq t)$$

If it is unlikely for c and e to occur at different times within time t of each other, the last term above is approximately 0, so $P(T_e\leq t)\approx P(T_e=T_c\leq t)$ and equation (1) can be applied to get the approximate decomposition equation $$P(T_e\leq t)\leq P(T_c\leq t)\times P(T_e=T_c|T_c\leq t) \quad (3)$$

Hence, the original problem can be estimated by multiplying the solutions for the analogous subproblem and the classification subproblem.

There are multiple ways of decomposing the original problem as follows. Since e is the conjunction of c and d, the above method can be applied by using d for the analogous subproblem instead of c, which will result in a different approximate decomposition equation. Further, when e is the conjunction of more than two events, this decomposition can be repeated as desired. For example, if e is "$e_1$ & $e_2$ & $e_3$", example implementations can 1) decompose $P(T_e\leq t)$ into subproblems $P(T_{e1}$ & $e_2\leq t)$ and P($e_3$ occurs at the next $e_1$ & $e_2$ event) and 2) decompose the first subproblem $P(T_{e1}$ & $e_2\leq t)$ into $P(T_{e1}\leq t)$ and P($e_2$ occurs at the next $e_1$ event). The analogous subproblem in 1) is for $e_1$ & $e_2$, but $e_1$ & $e_3$, $e_2$ & $e_3$, $e_1$, $e_2$, or $e_3$ can also be chosen for a total of six choices. For the first three choices, the analogous subproblem involves a conjunction of two events and hence each of them may be further decomposed in two ways.

The number of ways to decompose a conjunction of n events is at least n! (n factorial); it grows rapidly with n. In practice, the method is expected to be applied with small values of n and use domain knowledge and heuristics to limit the number of decompositions considered.

By searching among the possible decompositions and values of the hyperparameter u in (2A), and by combining the best models for the subproblems, a more accurate estimate can be obtained over the conventional method that models $P(T_e\leq t)$ directly.

FIG. 1 illustrates the overall decomposition method, in accordance with an example implementation. The method is initiated through the intake of inputs at 101, which can involve data with feature vectors and events, as well as target event e which is the conjunction of multiple events.

At 102, the flow selects one of the events c in the conjunction. If e is the conjunction of four events $c_1$ to $c_4$, c is selected from the set $\{c_1, c_2, c_3, c_4\}$. The order in which c is selected can be random or prioritized. For example, the frequency of $c_i$ can be prioritized for use. Priorities can also be used to limit the search to a subset of all possible events.

At 103, the flow trains and selects a time-to-event model for event c, to get P(c occurs within time t|X), where X is the feature vector. At 104, the flow selects a time window u. The time window u is a continuous parameter. The time window can be selected from a discrete set of reasonable values, such as a regular grid search between minimum and maximum values, or otherwise in accordance with the desired implementation. At 105, the flow applies the classification subproblem module to train and select a model for P(e occurs|c occurs within u, X). At 106, the flow multiplies the probabilities from these two models. The multiplied probabilities are used as a model for the original problem P(e occurs within time t|X). At 107, the flow calculates the performance of this model. This flow is repeated for different c and u and selects the model with the best performance. The flow goes back to 102 if there are more (c, u) to search, otherwise the best model is selected and the flow ends.

The flow diagram shows a serial search for the best model:

$$(c^*,u^*)=\arg\max_{(c,u)}\text{performance}(c,u).$$

An alternative is to use a nested search procedure:

1) find the best u for each c (this can be done in parallel):

$$u^*(c)=\arg\max_u \text{performance}(c,u);$$

2) find the best c:

$$c^*=\arg\max_c \text{performance}(c,u^*(c)).$$

In 1), if there is a need to limit the search for u*(c) for computational reasons, the search can be terminated early if it appears that further search will not beat the best performance obtained thus far. If overfitting is a concern, the number of models in the search space can be reduced and/or the performance of the candidate models from 107 can be calculated on a separate hold-out dataset.

Figure 2:
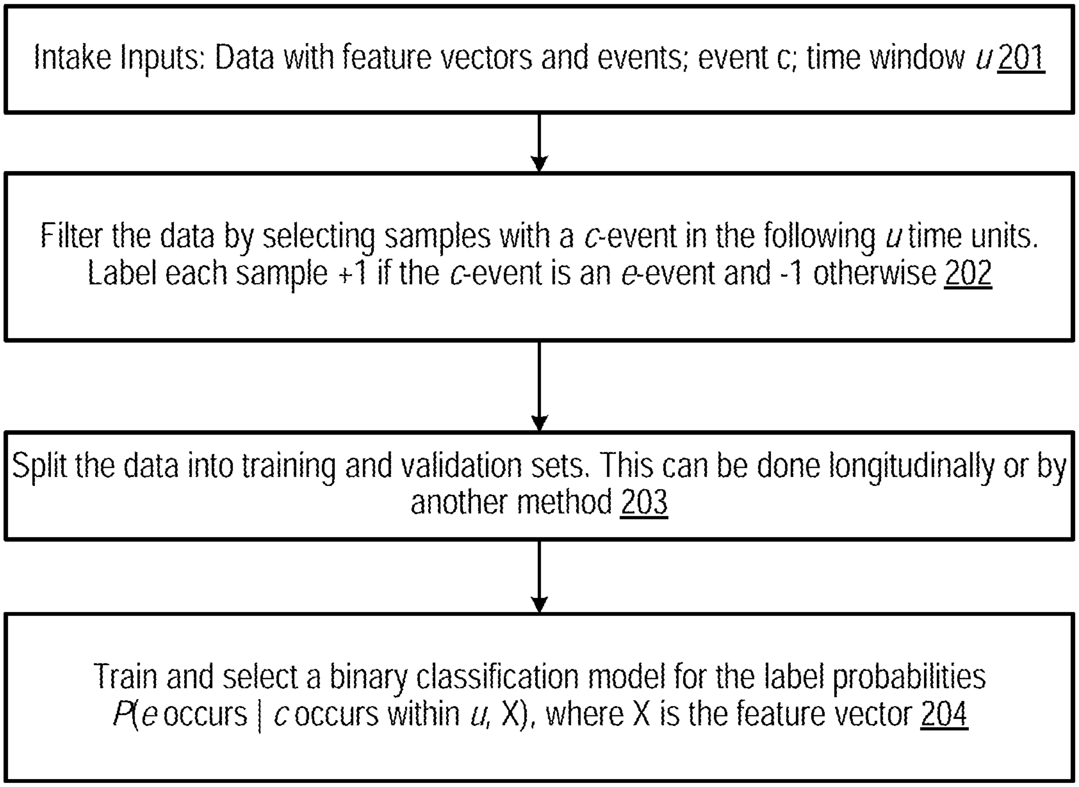
FIG. 2 illustrates the method for the classification subproblem, in accordance with an example implementation.

FIG. 2 illustrates the method for the classification subproblem, in accordance with an example implementation. The method is initiated through the intake of inputs involving data with feature vectors and events; event c; and time window u at 201. At 202, the flow filters the data by selecting samples with a c-event in the following u time units. Each sample is labeled as +1 if the c-event is an e-event and −1 otherwise. At 203, the flow splits the data into training and validation sets. This can be done longitudinally or by another method in accordance with the desired implementation. At 204, the flow trains and select a binary classification model for the label probabilities P(e occurs|c occurs within u, X), where X is the feature vector.

When e is a rare event, predicting $P(T_e \leq t)$—the probability that it will occur within t days—is challenging because of the imbalance between the positive and negative samples: there are many more samples without the event than with the event. The proposed decomposition method mitigates this by using a less rare event c in place of the original event e. There are more examples for learning the pattern of event c.

Figure 3A:
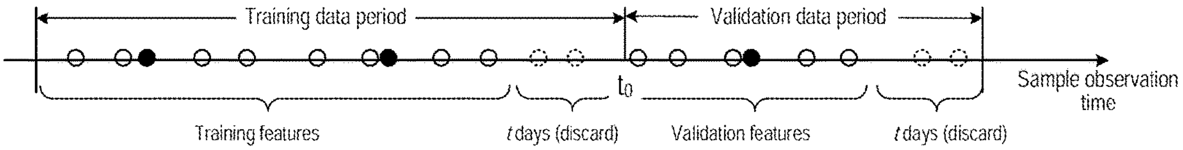
FIGS. 3(A) and 3(B) illustrate an example of predicting the original event and the less rare event, in accordance with an example implementation.
Figure 3B:
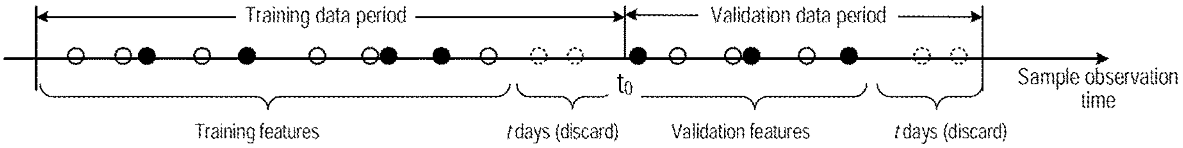

FIGS. 3(A) and 3(B) illustrate an example of predicting the original event and the less rare event, in accordance with an example implementation. FIG. 3(A) shows the data for predicting $P(T_e \leq t)$. Each circle represents a sample and it is placed on the horizontal timeline according to when it is observed. Different samples are shown with different observation times, but this is for illustration only and the present disclosure is not limited thereto. A circle is filled in FIG. 3(A) if the sample has an e-event in the following t days, i.e., $P(T_e \leq t)$. The data is divided longitudinally into a training set and a validation set, which is a common partitioning method for time-to-event problems. Models are trained on the data prior to some time $t_0$ and the best model is selected based on performance on the data after $t_0$. When e is rare, there may not be enough occurrences of e for proper training and validation. Although this can be mitigated by obtaining more occurrences through increasing the population (the subjects that make up the samples) or the total duration of the data, such mitigations may be infeasible or too costly.

Samples in the last t days of the training data period cannot be used since only partial information about $P(T_e \leq t)$ is available, as the t days following such a sample extend past the end of the data (to). This issue also applies to the validation period and is known as censoring. In FIG. 3(A), such points are shown as dashed circles. Censoring further reduces the number of event occurrences available for training and validation.

FIG. 3(B) illustrates the analogous problem of predicting $P(T_c \leq t)$ for event c, which is one of the subproblems in our decomposition method. Samples with c-events are shown as blue circles. Since there are more c-events available for model learning and validation, this mitigates the problem of data imbalance associated with predicting a rare event.

Figure 4:
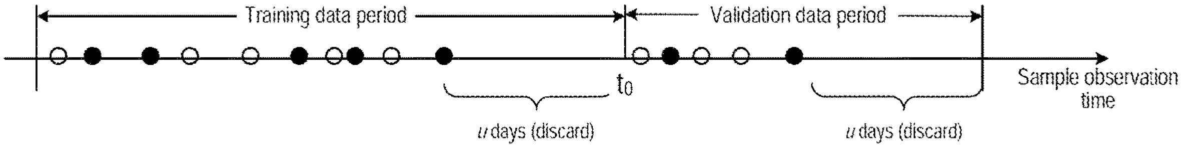
FIG. 4 illustrates the other classification subproblem in the decomposition method, in accordance with an example implementation.

In example implementations described herein, the possible decompositions and hyperparameter values are searched, which can lead to a more accurate estimate. FIG. 4 illustrates the other classification subproblem in the decomposition method, which is to predict if a c-event within u days is also an e-event. Each circle represents a sample with a c-event in the following u days. If the c-event is also an e-event, it is shown as a filled circle, otherwise it is shown as an unfilled circle in FIG. 4. This is a binary classification problem parameterized by u.

Choose u>t to try to include more c- and e-events than in the original problem and hence learn a model from more events. Suppose u is increased from 30 to 60. Then, for the training data period in FIG. 4, a longer window is discarded because of censoring, comprising the last 60 days instead of 30 days. In the remaining window, more samples are available for training, since they only need to have a c-event in the following 60 days instead of 30 days. These two competing effects may result in more or fewer training samples overall.

The choice of u also affects the nature of the classification problem P(e occurs|c occurs with u days). The value of u that gives the best performance for the original problem is likely to be problem dependent, so different values can be searched over in the decomposition method.

Predicting event occurrence has many industrial applications. Some of those involve events that are conjunctions of two or more events, for which our decomposition method is applicable.

As an example, a company that owns a large fleet of vehicles would like to predict if each car will require periodic maintenance in the next 45 days. The estimated probabilities produced by the method described herein can be used by their information technology (IT) system to automatically recommend to their drivers to schedule a periodic maintenance when the estimated probability is high. This can improve customer satisfaction and reduce maintenance costs.

During periodic maintenance, the car's engine oil, oil filter, air filter, and climate filter are replaced, so the periodic maintenance event e is a conjunction of the four events associated with these components. After searching through the possible decompositions and hyperparameters in our decomposition method, the best model is obtained by using c=engine oil replacement in the analogous subproblem and u=240 days in the classification subproblem.

FIG. 5 illustrates examples of performance metrics achieved by a direct method of predicting periodic maintenance and two variants of the method in accordance with the example implementations described herein. All models were trained using the same machine learning algorithm (XGBoost) on the same set of features. Since the algorithm is stochastic, multiple runs were conducted to estimate the average and standard errors of the performance metrics. The standard errors (not shown) validate that the decomposition method with hyperparameter tuning has significantly greater P10, P25, and AUCPR than the direct method.

Since the same machine learning algorithm was used, the improvement is due to the proposed decomposition method. Even though Bayes' Theorem—on which the proposed method is based—is well known, it is not obvious to apply it to obtain the approximate decomposition equation (3).

Figure 6:
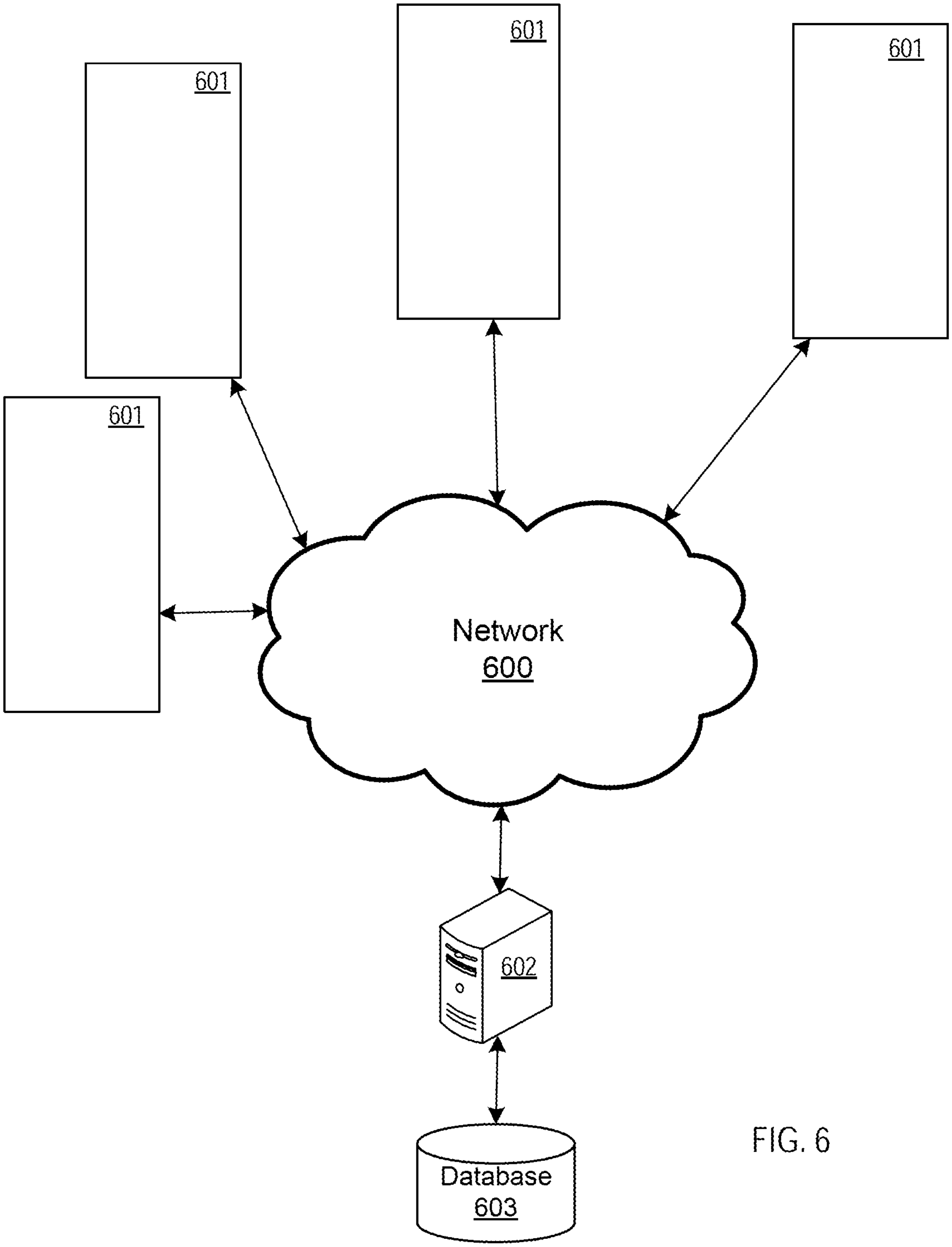
FIG. 6 illustrates a system involving a plurality of industrial systems networked to a management apparatus, in accordance with an example implementation.

FIG. 6 illustrates a system involving a plurality of industrial systems networked to a management apparatus, in accordance with an example implementation. One or more industrial systems 601 are communicatively coupled to a network 600 (e.g., local area network (LAN), wide area network (WAN)) through the corresponding on-board computer or Internet of Things (IoT) device of the industrial systems 601, which is connected to a management apparatus 602. The management apparatus 602 manages a database 603, which contains historical data collected from the industrial systems 601 and also facilitates remote control to each of the industrial systems 601. In alternate example implementations, the data from the industrial systems can be stored to a central repository or central database such as proprietary databases that intake data, or systems such as enterprise resource planning systems, and the management apparatus 602 can access or retrieve the data from the central repository or central database. Industrial system 601 can involve any physical system in accordance with the desired implementation, such as but not limited to air compressors, lathes, trucks, and so on in accordance with the desired implementation.

Figure 7:
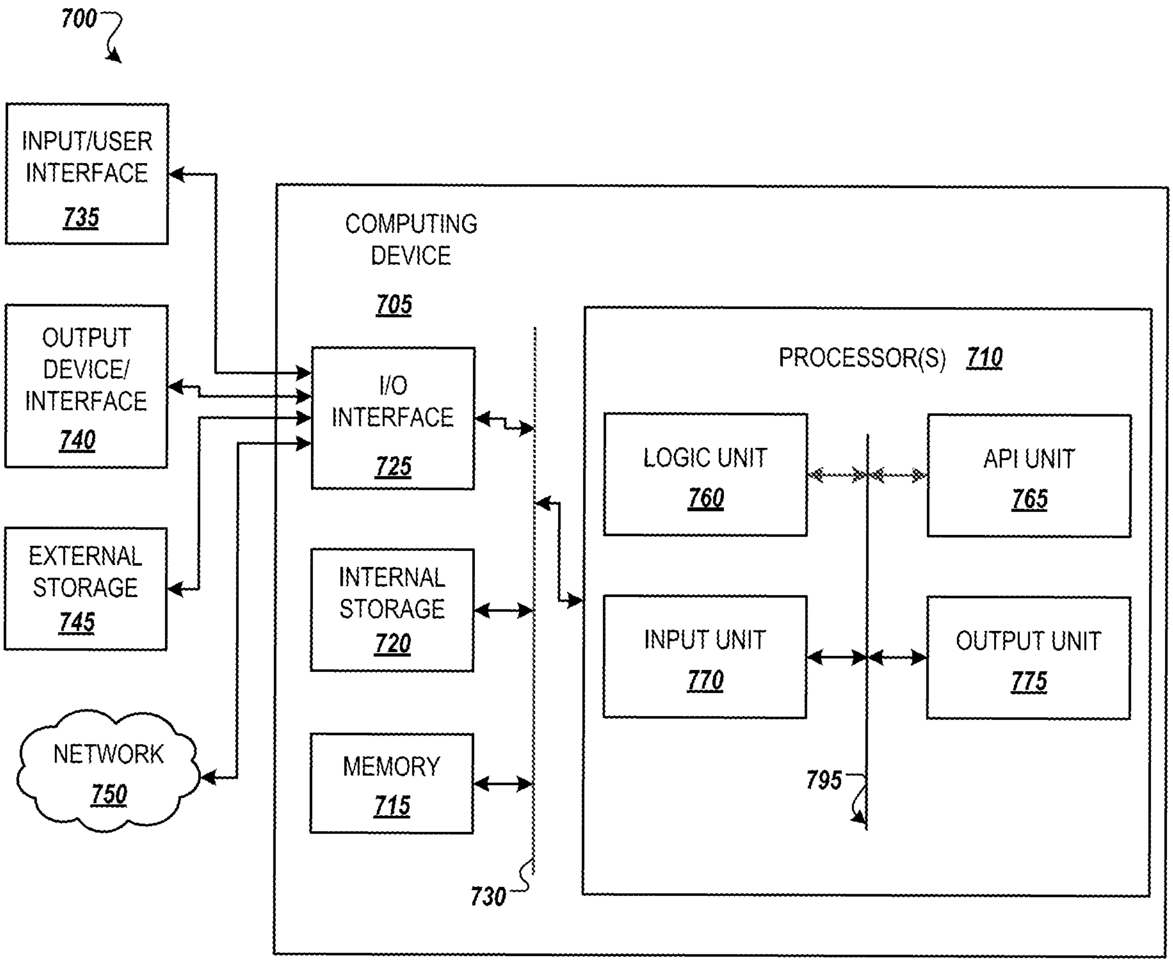
FIG. 7 illustrates an example computing environment with an example computer device suitable for use in some example implementations.

FIG. 7 illustrates an example computing environment with an example computer device suitable for use in some example implementations, such as a management apparatus 602 as illustrated in FIG. 6, or as an on-board computer of an industrial system 601. Computer device 705 in computing environment 700 can include one or more processing units, cores, or processors 710, memory 715 (e.g., RAM, ROM, and/or the like), internal storage 720 (e.g., magnetic, optical, solid state storage, and/or organic), and/or I/O interface 725, any of which can be coupled on a communication mechanism or bus 730 for communicating information or embedded in the computer device 705. I/O interface 725 is also configured to receive images from cameras or provide images to projectors or displays, depending on the desired implementation.

Computer device 705 can be communicatively coupled to input/user interface 735 and output device/interface 740. Either one or both of input/user interface 735 and output device/interface 740 can be a wired or wireless interface and can be detachable. Input/user interface 735 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 740 may include a display, television, monitor, printer, speaker, braille, or the like. In some example implementations, input/user interface 735 and output device/interface 740 can be embedded with or physically coupled to the computer device 705. In other example implementations, other computer devices may function as or provide the functions of input/user interface 735 and output device/interface 740 for a computer device 705.

Examples of computer device 705 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 705 can be communicatively coupled (e.g., via I/O interface 725) to external storage 745 and network 750 for communicating with any number of networked components, devices, and systems, including one or more computer devices of the same or different configuration. Computer device 705 or any connected computer device can be functioning as, providing services of, or referred to as a server, client, thin server, general machine, special-purpose machine, or another label.

I/O interface 725 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 700. Network 750 can be any network or combination of networks (e.g., the Internet, local area network, wide area network, a telephonic network, a cellular network, satellite network, and the like).

Computer device 705 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 710 can execute under any operating system (OS) (not shown), in a native or virtual environment. One or more applications can be deployed that include logic unit 760, application programming interface (API) unit 765, input unit 770, output unit 775, and inter-unit communication mechanism 795 for the different units to communicate with each other, with the OS, and with other applications (not shown). The described units and elements can be varied in design, function, configuration, or implementation and are not limited to the descriptions provided. Processor(s) 710 can be in the form of hardware processors such as central processing units (CPUs) or in a combination of hardware and software units.

In some example implementations, when information or an execution instruction is received by API unit 765, it may be communicated to one or more other units (e.g., logic unit 760, input unit 770, output unit 775). In some instances, logic unit 760 may be configured to control the information flow among the units and direct the services provided by API unit 765, input unit 770, output unit 775, in some example implementations described above. For example, the flow of one or more processes or implementations may be controlled by logic unit 760 alone or in conjunction with API unit 765. The input unit 770 may be configured to obtain input for the calculations described in the example implementations, and the output unit 775 may be configured to provide output based on the calculations described in example implementations.

Processor(s) 710 can be configured to execute instructions which can involve, for generating a model configured to predict a first event ($T_e$) occurring within a first time period t for a physical system such as an industrial system as described in FIG. 6, identifying a second event ($T_c$) that is a co-occurring pre-requisite for the occurrence of the event; learning a first model for the second event ($P(T_c \leq t)$) occurring within the first time period; generating a second model ($P(T_e = T_c | T_c \leq t)$) configured to determine probability of the first event given occurrence of the second event within the first time period; generating a third model (P(e occurs at the next c event$|T_c \leq u$)), the third model resulting in a more accurate prediction of the first event occurring within the first time period than the second model when used with the first model; and generating the model ($P(T_e \leq t) \approx P(T_c \leq t) \times P(T_e = T_c | T_c \leq t)$) based on the first model and the third model as illustrated in FIG. 1.

Processor(s) 710 can be configured to execute instructions involving generating the third model by searching for a second time period to replace the first time period to generate the third model, wherein the second time period is longer than the first time period. Depending on the desired implementation, there may be no need to search for a second time period to replace the first time period. In that case, the generated model can be based on the first and second models.

Processor(s) 710 can be configured to execute instructions for searching for the second time period to replace the first time period to generate the third model by executing a grid search on training data with a plurality of time periods, each of the plurality of time periods being longer than the first time period; and selecting the second time period from the plurality of time periods, the second time period having a more accurate prediction of the first event when used with the first model.

Processor(s) 710 can be configured to execute instructions for generating the third model, the generating the third model involving selecting samples of data having the second event within a second time period of the sample observation time; labeling each of the selected samples of data having the second event based on an occurrence or non-occurrence of the first event among the each of the selected samples of data; and training the third model using a machine learning algorithm based on the labeled each of the selected samples of data as illustrated in FIG. 2.

Processor(s) 710 can be configured to execute instructions for identifying a second event by selecting the second event from a plurality of second events, the plurality of second events being a set of events that is a pre-requisite of the first event. In such example implementations, the selecting is a random selection from the plurality of second events, and/or the selecting is based on prioritizing ones of the plurality of second events having a higher occurrence rate.

Processor(s) 710 can be configured to execute instructions for generating the model based on the first model and the third model by using the first model and the third model as a decomposition of the model. Depending on the desired implementation, the generating the model based on the first model and third model can involve taking a product of the first model and the third model.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:

for generating a model configured to predict a first event occurring within a first time period for a vehicle system;

identifying a second event that is a one of multiple events whose conjunction constitutes the first event;

learning a first model for the second event occurring within the first time period;

generating a second model configured to determine probability of the first event given occurrence of the second event within the first time period;

generating a third model, the third model resulting in a more accurate prediction of the first event occurring within the first time period than the second model when used with the first model;

generating the model based on the first model and the third model;

in response to the generated model indicating that the first event will occur within the first time period, transmitting a maintenance scheduling recommendation to the vehicle system; and performing a maintenance operation on the vehicle system.

2. The method of claim 1, wherein the generating the third model further comprises searching for a second time period to replace the first time period to generate the third model, wherein the second time period is longer than the first time period.

3. The method of claim 2, wherein the searching for the second time period to replace the first time period to generate the third model comprises:

executing a grid search on training data with a plurality of time periods, each of the plurality of time periods being longer than the first time period; and selecting the second time period from the plurality of time periods, the second time period having a more accurate prediction of the first event when used with the first model.

4. The method of claim 1, further comprising generating the third model, the generating the third model comprising:

selecting samples of data having the second event within a second time period of a sample observation time;

labeling each of the selected samples of data having the second event based on an occurrence or non-occurrence of the first event among the each of the selected samples of data; and training the third model using a machine learning algorithm based on the labeled each of the selected samples of data.

5. The method of claim 1, wherein the identifying the second event comprises selecting the second event from a plurality of second events, the plurality of second events being a set of events that is a pre-requisite of the first event.

6. The method of claim 5, wherein the selecting is a random selection from the plurality of second events.

7. The method of claim 5, wherein the selecting is based on prioritizing ones of the plurality of second events having a higher occurrence rate.

8. The method of claim 1, wherein the generating the model based on the first model and the third model comprises using the first model and the third model as a decomposition of the model.

9. The method of claim 8, wherein the generating the model based on the first model and third model comprises taking a product of the first model and the third model.

10. A non-transitory computer readable medium, storing instructions for executing a process comprising:

for generating a model configured to predict a first event occurring within a first time period for a vehicle system:

identifying a second event that is a one of multiple events whose conjunction constitutes the first event;

learning a first model for the second event occurring within the first time period;

generating a second model configured to determine probability of the first event given occurrence of the second event within the first time period;

generating a third model, the third model resulting in a more accurate prediction of the first event occurring within the first time period than the second model when used with the first model; and generating the model based on the first model and the third model;

in response to the generated model indicating that the first event will occur within the first time period, transmitting a maintenance scheduling recommendation to the vehicle system; and performing a maintenance operation on the vehicle system.

11. The non-transitory computer readable medium of claim 10, wherein the generating the third model further comprises searching for a second time period to replace the first time period to generate the third model, wherein the second time period is longer than the first time period.

12. The non-transitory computer readable medium of claim 11, wherein the searching for the second time period to replace the first time period to generate the third model comprises:

executing a grid search on training data with a plurality of time periods, each of the plurality of time periods being longer than the first time period; and selecting the second time period from the plurality of time periods, the second time period having a more accurate prediction of the first event when used with the first model.

13. The non-transitory computer readable medium of claim 10, the instructions further comprising generating the third model, the generating the third model comprising:

selecting samples of data having the second event within a second time period of a sample observation time;

labeling each of the selected samples of data having the second event based on an occurrence or non-occurrence of the first event among the each of the selected samples of data; and training the third model using a machine learning algorithm based on the labeled each of the selected samples of data.

14. The non-transitory computer readable medium of claim 10, wherein the identifying the second event comprises selecting the second event from a plurality of second events, the plurality of second events being a set of events that is a pre-requisite of the first event.

15. The non-transitory computer readable medium of claim 14, wherein the selecting is a random selection from the plurality of second events.

16. The non-transitory computer readable medium of claim 14, wherein the selecting is based on prioritizing ones of the plurality of second events having a higher occurrence rate.

17. The non-transitory compute computer readable medium of claim 10, wherein the generating the model based on the first model and the third model comprises using the first model and the third model as a decomposition of the model.

18. The non-transitory computer readable medium of claim 17, wherein the generating the model based on the first model and third model comprises taking a product of the first model and the third model.

19. An apparatus, comprising:

a processor, configured to:

for generating a model configured to predict a first event occurring within a first time period for a physical vehicle system:

identify a second event that is a one of multiple events whose conjunction constitutes the first event;

learn a first model for the second event occurring within the first time period;

generate a second model configured to determine probability of the first event given occurrence of the second event within the first time period;

generate a third model, the third model resulting in a more accurate prediction of the first event occurring within the first time period than the second model when used with the first model; and generate the model based on the first model and the third model;

in response to the generated model indicating that the first event will occur within the first time period, transmit a maintenance scheduling recommendation to the vehicle system; and perform a maintenance operation on the vehicle system.

* * * * *